United States Patent [19]

Hallgreen

[11] 4,058,254
[45] Nov. 15, 1977

[54] TEMPERATURE-MONITORING AND CONTROL SYSTEM

[75] Inventor: Knud Julius Hallgreen, Nordborg, Denmark

[73] Assignee: Danfoss A/S, Nordborg, Denmark

[21] Appl. No.: 594,964

[22] Filed: July 11, 1975

Related U.S. Application Data

[63] Continuation-in-part of Ser. No. 510,046, Sept. 27, 1974, abandoned, which is a continuation of Ser. No. 793,505, Jan. 23, 1969, abandoned.

[30] Foreign Application Priority Data

Jan. 26, 1968 Germany .............................. 1753205

[51] Int. Cl.² ........................................... G05D 23/24
[52] U.S. Cl. .................................. 236/68 B; 219/499; 323/75 H
[58] Field of Search ................... 236/1 R, 68 B, 6, 36; 219/499; 317/42; 73/362 AR; 338/22 R; 323/75 H, 75 N; 361/165

[56] References Cited

U.S. PATENT DOCUMENTS

| 2,897,334 | 7/1959 | McFarlane et al. | 219/499 |
|---|---|---|---|
| 3,062,941 | 11/1962 | White | 219/20 |
| 3,231,714 | 1/1966 | Oram et al. | 219/499 X |
| 3,241,054 | 3/1966 | Blumenstock | 323/75 N |
| 3,246,838 | 4/1966 | Baver | 236/36 |

Primary Examiner—William E. Wayner

[57] ABSTRACT

The invention relates to a system for measuring or controlling the thermal comfort in spaces used by living beings. In operation an output signal is produced which indicates whether or how much the actual thermal conditions in the space differ from comfort conditions and this output signal may be used to control the comfort conditions in the space. The sensing means takes into account the same conditions as does a living being with respect to convection heat, radiation heat and the heat produced by metabolism. The last mentioned heat might be set in accordance to the activity level of the living being. The surface temperature of the sensing means is compared with a comfort temperature set by a second setting means. If the first setting means is set to a higher heat supply, the second setting means is simultaneously set to a lower comfort temperature and vice versa.

5 Claims, 4 Drawing Figures

TEMPERATURE-MONITORING AND CONTROL SYSTEM

This application is a continuation-in-part of Ser. No. 510,046 filed Sept. 27, 1974, now abandoned. Application Ser. No. 510,046, was a continuation of application Ser. No. 793,505 filed Jan. 23, 1969 and now abandoned.

This invention relates generally to a system for measuring or controlling conditions for thermal comfort in spaces used by living beings.

Temperature-sensing elements or devices monitoring and controlling temperature in work or living spaces for humans and stalls for animals generally sense or measure only the temperature of the surrounding air which flows past the sensor as a result of convection current flow. Experience with the known devices, however, indicates that simply sensing temperature of the surrounding air does not ensure comfort of the living beings or creatures in the heated or temperature-controlled space. A space controlled at a temperature that is pleasant in case of sedentary occupations will result in actually being too warm for physical activity or work therein. Conversely a space at a temperature agreeable or adequate when physical activity is being carried out in the space is inadequate in the event that less vigorous activity takes place therein. Furthermore, the radiation of heat and cold that takes place in the space plays a very big part in whether a space is being adequately temperature-controlled. A human being or animal receiving radiated heat, for example from the sun or from a radiant heating element, is more comfortable at a lower ambient temperature than another person not exposed to the thermal radiation.

It is known to use temperature-control devices having a Wheatstone bridge configuration with a negative temperature coefficient resistor connected in an arm of the bridge to act as a temperature sensor or sensing element. The particular resistance of the resistor is "measured" and is used as a measure of the temperature within a given space for effecting temperature control. The known temperature-control devices "measure" or sense and respond to only the surrounding temperature and thus do not properly control temperature in a space being heated.

It is a principal object of the present invention to provide a system which indicates whether thermal comfort for the living being is present in a space or how much the actual conditions differ from said comfort conditions.

It is a further object of the invention to use said indication for controlling the thermal comfort in said space.

The expression "thermal comfort" is defined (ASHRAE Standard 55-66, 1966) as that condition of mind which expresses satisfaction with the thermal environment and therefore means the whole of all conditions, especially air temperature, air flow, radiation and activity of the living being, which together give the feeling that it is just pleasantly warm in a space or room in which the living being is situated.

From measurements (P. O. Fanger, ASHRAE Transactions Vol. 73, Part II, 1967) it is known that the human feels comfortable if the conditions are such that the surface temperature is equal to a comfort temperature. Said comfort temperature is a function of the activity level (e. g. wood cleavering, writing desk work, eating) of the living being and decreases with increasing activity level. For a human being the comfort temperature at the skin is about 33° centigrade. For instance at an activity or metabolic rate for unit body surface area of 50 kcal/hr m² the comfort skin temperature is approximatly 34° centigrade and for an activity of 150 kcal/hr m² the comfort skin temperature is approximatly 31° centigrade. If the comfort temperature is related to the outside surface of the clothing of the human being the value is lower. The exact value depends on the kind of clothing. An example is at the range of 26° C. Corresponding levels or values apply in the case of other living beings.

According to the invention sensing means are provided which are adapted to be influenced by convection heat (thereby considering air temperature and air movement) and to receive and deliver radiant heat. In order to consider the inner heating of the living being, means for continuously supplying heat energy to the sensing means are provided so that its surface temperature is above ambient temperature. Further the surface temperature of the sensing means is compared with a preset comfort temperature and an output signal is produced if the surface temperature is not in balance with the comfort temperature. First setting means are used for changing the supplied heat energy in correspondence with the activity level of the living being and second setting means are used for changing the preset comfort temperature. The first and second setting means are coupled together for common setting in such way that an increase in the supplied heat energy corresponds to a decrease of the comfort temperature and vice versa.

In this system the output signal gives an indication whether thermal comfort is present in the space or how much the actual conditions differ from said comfort conditions. Said output signal might be used to control the temperature conditions in the space in order to maintain thermal comfort. If another activity level is set with the first setting means simultaneoulsy the setting of the comfort temperature is changed. So it is automatically considered that the living being feels comfortable at a higher activity level only if the comfort temperature is lowered and vice versa.

The surface of the sensing means has a radiant absorption coefficient which corresponds to that of the living being and this coefficient is comparable to the same coefficient of a human or the hide of an animal.

The output signal can be used to control the thermal input of the space so that the surface temperature of said sensing means is maintained constant at the preset comfort temperature. So it is possible to maintain thermal comfort in the space by controlling the air temperature by cooling or heating.

In a first embodiment of the system of the invention said comparing means is a bridge circuit, said sensing means is a NTC-resistance in one branch and said second setting means is a rheostat in a second branch of said bridge circuit. In this connection said first setting means may control the supply voltage of said bridge circuit so that the heating current flowing through the NTC-resistance might be changed. It is also possible that said first setting controls the current through a heater arranged near said sensing means. Said heater might be energized from a variable voltage source so that in this way temperature sensing and supply of thermal energy are independent of each other.

In another embodiment of the system of the invention said comparing means is a known thermostatic valve, the temperature setting equipment of which is used as second setting means and the sensing element of which is used as sensing means and provided with a heater the heating current of which is controlled by the first setting means. Said valve may have a sensing element in which an expansible fluid in a bulb expands in response to temperature variations. The surface of the thermostatic sensing element is heated by a continuoulsy acting heating element and the material of the sensor is such that its thermal-radiation-absorbing properties are those of a creature or being having the same coefficient so that it is influenced by ambient temperature and radiation. The expansible material in the sensor may be steam, a liquid or a solid substance. Bimetallic sensors may likewise be employed according to the invention.

The sensing means in the apparatus, in accordance with the invention, is generally disposed within a space or room where temperature is being controlled so that its sensing surface is impinged upon by radiation that occurs as well as by convection. If radiation is to be taken into account, for example radiation through a window, the sensor is not generally placed directly to receive the radiation through the window but is placed at a distance, from one to two meters, from the window. Likewise in rooms heated by ceiling radiation systems the sensing means of the invention is so positioned that it is influenced by the radiated heat.

Other features and advantages of the system in accordance with the present invention will be better understood as described in the following specification and appended claims, in conjunction with the following drawings in which:

Figure 1:
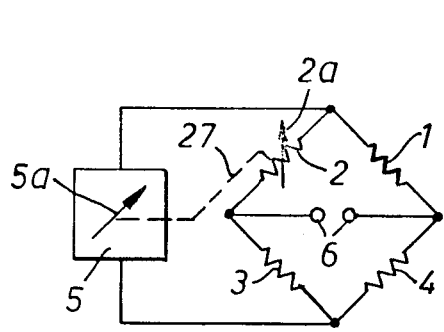
FIG. 1, is a diagrammatic illustration of a system for measuring and for controlling the thermal comfort according to the invention.

FIG. 1 illustrates a first embodiment of a system according to the invention having a negative temperature coefficient resistor 1 connected with other resistors 2, 3, 4 each connected in a respective arm or section of a bridge circuit as illustrated. This embodiment has first and second adjustable setting means 5a and 2a. Resistor 2 is a rheostat having the second adjustable setting means 2a for setting a resistance corresponding to a comfort temperature. A voltage is applied across two junctions of the bridge circuit as shown and across a resistor 4 in series with the sensor 1 from a variable voltage source 5 having the first adjustable setting means 5a. It can take the form of a voltage divider connected to a fixed voltage, for instance. The setting means 2a and 5a are coupled by common setting means 27 in such way that an increase of the voltage from source 5 (increase of activity level) corresponds to an increase of the resistance of rheostat 2 (decrease of comfort temperature). At the other junctions of the bridge circuit a control voltage or output signal is taken off at output terminals 6. The control output is a voltage actuating an indicating device or controlling a control element, for example an electromagnetic device, of a heating system, not shown, to control the temperature in a space, in which to control system is used, as a function of the value of the control output.

The negative temperature coefficient resistor or sensor 1 has its resistance influenced by convection heat, that means air temperature and air currents, and thermal radiation that occurs within the space in which the sensor 1 is situated. In view of the sensing of convection heat, thermal radiation and because of the heating current flow in the resistor 1 a temperature equilibrium is established at the surface of the resistor since it is made of a material that both absorbs heat and can radiate heat. The output voltage at the terminal 6 is a measure or function of the equilibrium temperature in comparison with comfort temperature set by the resistance of rheostat 2.

It has been found that the sensor 1 can be made as a negative temperature coefficient resistor of most of the usual materials from which these resistors are made. Particularly good results are obtained if the surface of the sensor has a thermal-radiation-coefficient which corresponds to that of a living being. This coefficient can, therefore, suit the coefficient of a human or the hide of an animal. Normally negative temperature coefficient resistors have a surface color which is like that of coke, and this provides a surface with the suitable coefficient.

A summary review of the operation of the embodiment of FIG. 1 would be helpful. Briefly the operation involves two separate controls to accommodate two independent conditions. The first variable setting control 5 for varying the voltage across the bridge affects the relationship of the NTC resistor 1 relative to the resistor 4 to vary the voltage of the right hand terminal 6. The second variable setting control 2 affects the relationship between the rheostat 2 and the resistor 3 to vary the voltage of the left hand terminal 6.

As an aside, the right and left sides of the terminals 6 may be conveniently referred to herein as first and second indicator means for indicating (1) the temperature of the resistor 1 and (2) a desired temperature setting.

The varying of the resistance value of NTC resistor 1 simulates the activity of a person in that the more active he is the more heat he generates. The varying of the resistance value of the resistor 2 corresponds to different desired heat settings for the room in which the temperature is being controlled. The difference in the voltages of the left and right terminals 6 provides signals which can be used to operate heating and cooling equipment.

An example of the operation may be helpful. For convenience the voltages of the left and right terminals 6 will be referred to as Vx and Vy. As a starting point a stable condition will be assumed where $Vx = Vy$ and the room is being used for playing cards. It is then desired to use the room for dancing and cooler temperatures are desired. Voltage across the bridge is increased by control 5 and this has the effect of increasing the voltage of Vy because the increased current through the NTC resistor 1 raises the temperature thereof and causes its resistance value to drop.

At the same time the common control 27 increases the resistance value of rheostat 2 and this has the effect of reducing the voltage Vx. With Vy being increased and Vx being decreased, the voltage differential constitutes a signal which could operate cooling apparatus which in turn would cool the sensing resistor 1 until such time that voltage of Vy was lowered to a point where it was equal to Vx and the cooling equipment would shut off. It is significant to note that Vx is only controlled by the rheostat 2 whereas Vy is controlled by both the control 5 and the temperature of the room.

Figure 2:
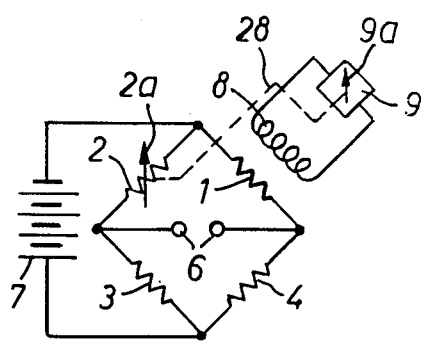
FIG. 2, is a schematic or diagrammatic illustration of a second embodiment of a system of the type illustrated in FIG. 1.

In a second embodiment of the system of the invention, illustrated in FIG. 2, a bridge circuit constructed in the manner of the bridge circuit of the embodiment in FIG. 1 is shown. This circuit has similar elements designated with reference numerals similar to those in FIG. 1 for ease in comparison and has a constant voltage source 7 connected across the bridge in the manner of the variable voltage source 5. The constant voltage source 7 has little or no effect on the thermal behavior of the negative temperature coefficient resistor 1, instead a heating coil 8 energized by a variable power source 9 having a setting means 9a can be set so that a prescribed thermal energy is provided for the sensor 1. Common setting means 28 is coupling setting means 2a and 9a in a way similar to FIG. 1. In this case too an equilibrium temperature is established on the surface of the resistor such that the level of this temperature in comparison with the control temperature set by rheostat 2 is represented by the output voltage from output terminals 6. The surface of the resistor, in these systems, is maintained at a temperature higher than the value of the ambient temperature within the space being sensed.

Figure 3:
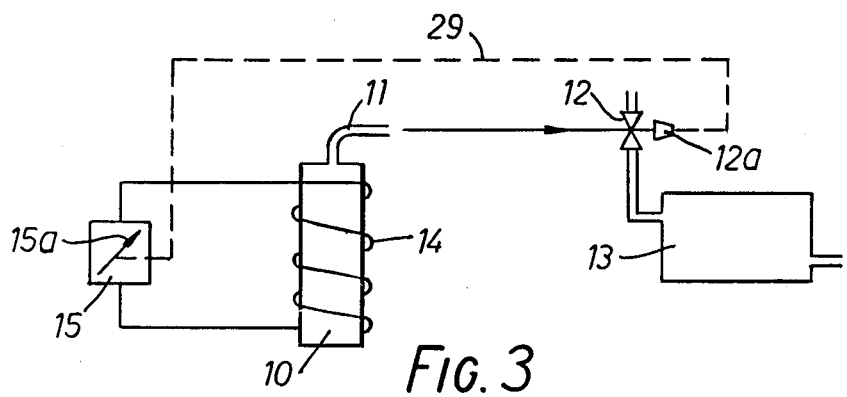
FIG. 3, is a diagram of a third embodiment of a system for controlling the thermal comfort according to the invention.

In FIG. 3 a conventional thermostatic system has the invention applied thereto. This system according to the invention has a sensor 10 comprising a thermostatic bulb which contains or is filled with an expansible fluid, for example a fluid responsive to temperature variations, and applies a control output through a capillary tube 11 to a control or thermostatic valve 12. Said valve has a usual temperature setting equipment 12a for setting the temperature wanted, here the comfort temperature. The control valve controls supply of a heating medium to a heating element 13 heating the room or space being monitored by the sensor 10. The sensing element 10 has a heating coil 14 wound around the sensor and energized from a variable voltage source 15 with a predetermined current set by setting means 15a. The heating coil determines the heat energy for the sensor 10. The setting means 12a and 15a have common setting means 29, so that a higher heating current in coil 14 corresponds to a lower comfort temperature set by equipment 15a.

In this embodiment likewise the temperature of the sensor 10 is compared with the comfort temperature to develop a control output in the form of the opening of the valve, similar to the type of output heretofore described. The sensor is made of such a form and metallic material that it can dissipate heat and absorb radiation. Preferably the bulb 10 should have a surface coating having a coefficient of the type heretofore described. This coefficient is equal to 0.93-0.95 which is equal to the absorption coefficient of a living being. Moreover, the surface or coating on the bulb should be a dull black. Consequently, the valve 12 is controlled in dependence upon ambient temperature, air movement, thermal radiation impinging upon the sensor 10 the level of physical activity determined by the current in the heating coil 14 and comfort temperature set by equipment 15a. The entire arrangement thus forms a temperature control or regulating system wherein the surface temperature of the sensor 10 is constantly held at a value corresponding to the temperature which living beings are comfortable at the level of physical activity taking place in the space being monitored and whose temperature is being controlled.

Figure 4:
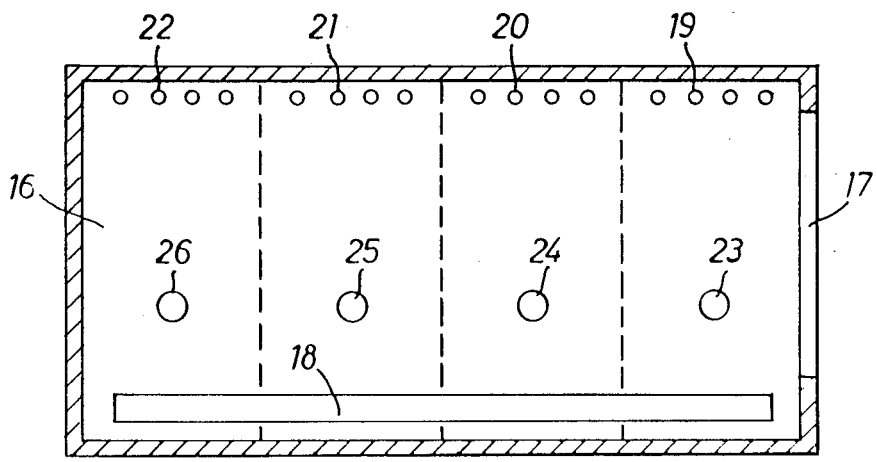
FIG. 4, is a diagrammatic illustration of a plan view of a room using several heating systems under control of systems according to the invention.

In heating a room or space the thermal conditions above described must be taken into consideration. In FIG. 4 a plan view of a room 16 is diagrammatically illustrated. The room is illustrated as having a window 17 at one end thereof which is assumed to be of a considerable height. The room is heated by an elongated heating element 18 and also by ceiling heating means or elements shown diagrammatically and divided into four sections designated 19, 20, 21 and 22.

Temperature control systems are illustrated as having a plurality of sensors 23-26 constructed in any of the types above illustrated in FIGS. 1-3 inclusive. The sensors independently control respective sections of the ceiling-heating system. The elongated heating element 18 provides basic heating. The ceiling-heating sections 19-22 are regulated individually by the associated sensors and their temperature control systems 23-26.

With an arrangement of the type disclosed in FIG. 4 on a very cold winter day without much sunlight, for example, the section 19 of the ceiling-heating system must supply considerably more radiated heat than the section 22 adjacent the opposite end of the room 16 in order to provide a person seated near the window with the same degree of comfort as a person seated at the rear end of the room which constitutes the end of the room opposite to the end at which the window is located. Conversely when sunlight enters through the window 17 the heating section 22 must work harder than the section 19.

While preferred embodiments of the invention have been shown and described it will be understood that many modifications and changes can be made within the true spirit and scope of the invention.

I claim:

1. A system for controlling the thermal comfort in a space used by living beings comprising sensing means adapted to be influenced by convection heat and to receive and deliver radiant heat, first adjustable setting means for continuously supplying heat energy to said sensing means corresponding to an expected activity level so that its surface temperature is above ambient temperature, first indicator means for indicating the temperature of said sensing means, second adjustable setting means for selecting a desired comfort temperature setting, second indicator means associated with said second adjustable setting means for indicating said desired comfort temperature setting, and means for the common setting of said first and second setting means so that an increase in the heat energy supplied to said sensing means corresponds to a lowering of said desired comfort temperature setting and vice versa; said first and second indicating means being subject to comparison to control the thermal input to said space.

2. A system according to claim 1 in which said surface of said sensing means has a radiant absorption coefficient which corresponds to that of a living being.

3. A system according to claim 2 in which said sensing means and said first and second indicator means are in a bridge circuit, said sensing means being an NTC-resistance in one branch and said second setting means being a rheostat in a second branch of said bridge circuit.

4. A system according to claim 3 in which said first setting means controls the supply voltage of said bridge circuit.

5. A system according to claim 3 in which said first setting means controls the current through a heater arranged near said sensing means.

* * * * *